(12) United States Patent
Kobayakawa

(10) Patent No.: US 8,007,034 B2
(45) Date of Patent: Aug. 30, 2011

(54) VEHICLE BODY STRUCTURE INCLUDING A CANISTER

(75) Inventor: Takashi Kobayakawa, Zama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 405 days.

(21) Appl. No.: 12/421,154

(22) Filed: Apr. 9, 2009

(65) Prior Publication Data

US 2009/0256390 A1    Oct. 15, 2009

(30) Foreign Application Priority Data

Apr. 15, 2008   (JP) .................................. 2008-105480
Jan. 19, 2009   (JP) .................................. 2009-008495

(51) Int. Cl.
*B62D 25/08*         (2006.01)

(52) U.S. Cl. .............................. 296/193.08; 296/203.04

(58) Field of Classification Search ............. 296/187.11, 296/187.08, 193.07, 193.08, 204, 203.04; 280/830, 834; 220/4.14; D12/218; 180/69.4, 180/69.5, 124.1
See application file for complete search history.

(56) References Cited

U.S. PATENT DOCUMENTS

| | | | | |
|---|---|---|---|---|
| 5,195,780 A * | 3/1993 | Inoue et al. | .................... | 296/204 |
| 5,868,428 A * | 2/1999 | Ishikawa | ........................ | 280/834 |
| 6,308,987 B1 * | 10/2001 | Mitake | ........................... | 280/834 |
| 2009/0195030 A1 * | 8/2009 | Yamaguchi et al. | ..... | 296/193.08 |

FOREIGN PATENT DOCUMENTS

JP          HEI 8-142693          6/1996
* cited by examiner

*Primary Examiner* — Lori Lyjak
(74) *Attorney, Agent, or Firm* — Young Basile

(57) ABSTRACT

When a luggage floor moves forward of the vehicle by an external force from the rear of the vehicle, a front surface portion of the luggage floor strikes left and right rear side leg portions of a rear suspension member to avoid applying an input load to the canister. The canister is disposed at nearly the same position as the left and right rear side leg portions of the rear suspension member or at a position more forward than that position.

16 Claims, 4 Drawing Sheets

VEHICLE BODY STRUCTURE INCLUDING A CANISTER

CROSS-REFERENCE TO RELATED APPLICATIONS

This application claims priority from Japanese Patent Application Serial Nos. 2008-105480, filed Apr. 15, 2008, and 2009-008495, filed Jan. 19, 2009, each of which is incorporated herein in its entirety by reference.

TECHNICAL FIELD

The invention relates generally to a vehicle body structure including a canister.

BACKGROUND

There is disclosed in Unexamined Japanese Patent Publication No. 8-142693 a technique in which a canister is disposed at an approximately middle position of a rear cross member that connects between rear side members on opposite vehicle body sides. By disposing the canister at an approximately middle position of the rear cross member, vibrations transmitted to the canister are minimized to prevent an absorbent material filled in the canister from being deteriorated by the vibrations.

BRIEF SUMMARY

Embodiments of a vehicle body structure are taught herein. According to one exemplary embodiment for a vehicle body, the vehicle body structure comprises a rear suspension member extending in a vehicle width direction and having rear side leg portions provided on opposite ends of the rear suspension member in the vehicle width direction. The rear side leg portions are spaced apart by a first distance in the vehicle width direction and are fixed to the vehicle body. The structure also includes a luggage floor located rearward of the rear suspension member in a vehicle longitudinal direction and having a front surface extending downward in the vehicle height direction from the vehicle body. The front surface spans a second distance in the vehicle width direction. A canister is disposed forward in the vehicle longitudinal direction of the front surface of the luggage floor and between the rear side leg portions, and the second distance is wider in a vehicle width direction than the first distance.

Details and variations regarding this embodiment and others are described in additional detail below.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the technique of Unexamined Japanese Patent Publication No. 8-142693, the canister is disposed so as to protrude more rearward than the rear cross member and a rear end attaching portion of a rear sub-frame. For this reason, an external force applied to a vehicle rear portion in the vehicle forward direction can cause a front surface portion of a luggage floor that extends downward from the vehicle to be pushed forward to contact the canister, resulting in a large impact load being applied to the canister.

In contrast, embodiments of the invention provide a canister arranging structure that is capable of protecting the canister by reducing an impact load against the canister when a luggage floor is pushed by an external force applied to a vehicle rear portion in the vehicle forward direction. When a luggage floor is pushed forward by an external force applied the rear of a vehicle, the front surface portion of the luggage floor strikes left and right rear side leg portions of a rear suspension member and reduces the input load against the canister.

Hereinafter, an exemplary embodiment of the invention is described in detail with reference to the drawings, starting with FIGS. 1 and 2.

Figure 1:
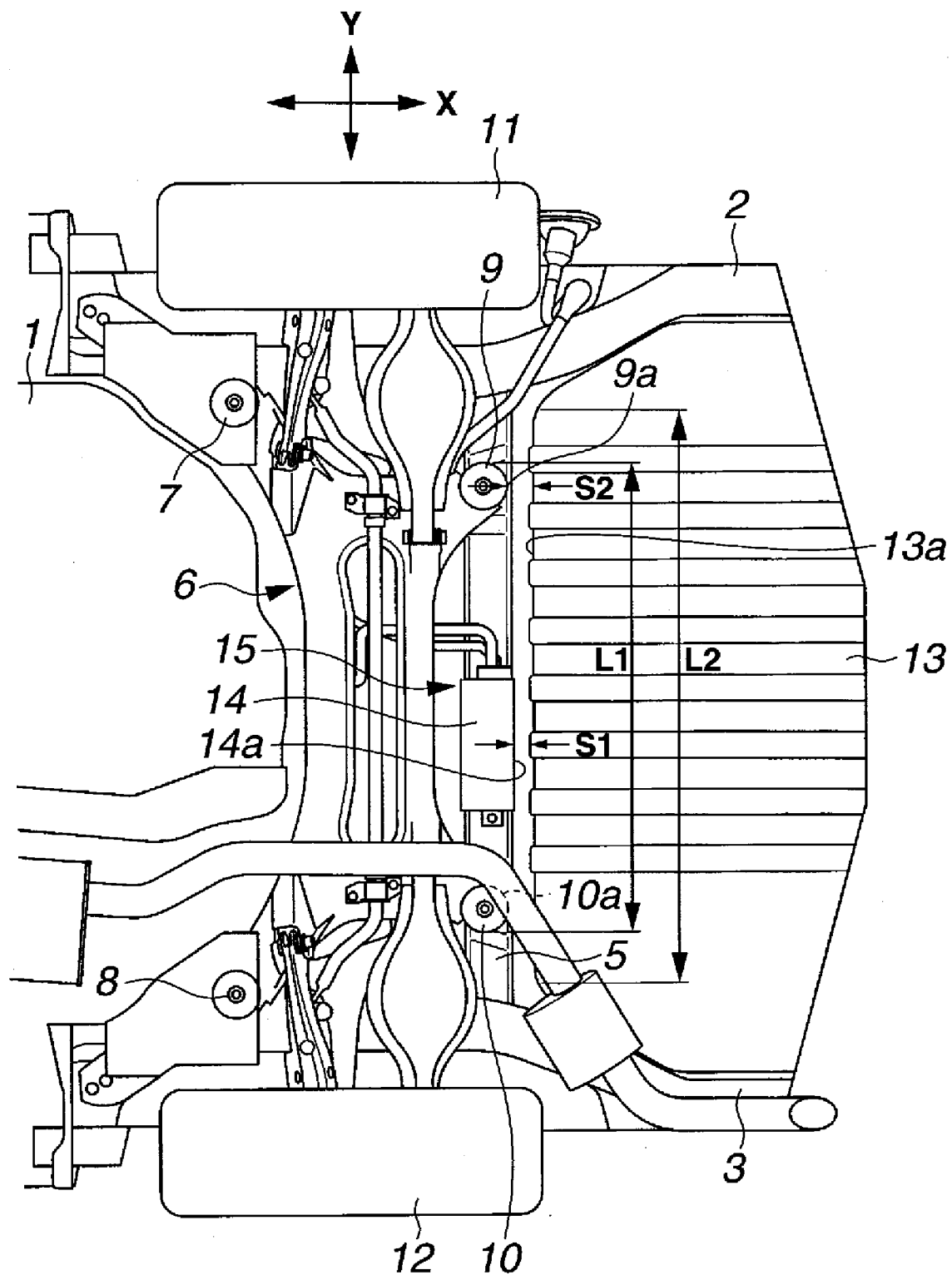
FIG. 1 is a bottom view of a vehicle showing a portion where a canister is disposed.

In FIG. 1, the X-axis indicates the vehicle longitudinal direction. The left side of the paper corresponds to the front of the vehicle, and the right side corresponds to the rear of the vehicle. The Y-axis indicates the vehicle width direction. In FIG. 2, the Z-axis indicates the vehicle height direction.

A fuel tank 1 is disposed between a pair of rear side members 2, 3 that extend in the vehicle longitudinal direction (X-axis) and are positioned at opposite ends in the vehicle width direction (Y-axis). The fuel tank 1 is disposed more forward of the vehicle than front side rear cross member 4 and rear side rear cross member 5 that connect the rear side members 2, 3 in the vehicle width direction.

A rear suspension member 6 is fixed at left and right front side leg portions 7, 8 to the corresponding rear side members 2, 3, respectively, by fastening means such as bolts and nuts. Rear suspension member 6 is also fixed at left and right rear side leg portions 9, 10 to the rear side rear cross member 5 by fastening means such as bolts and nuts.

On the rear suspension member 6 are suspended rear wheels 11, 12 using a rear suspension. In this embodiment, the rear wheels 11, 12 are disposed between the front side rear cross member 4 and the rear side rear cross member 5.

A luggage floor 13 is disposed on a vehicle rearward side of the rear side rear cross member 5, and the luggage floor 13 is formed so as to extend downward in the vehicle height direction from the vehicle body. The luggage floor 13 is sized so that the vehicle widthwise length L2 of its front surface portion 13a is larger than the distance L1 between the rear side leg portions 9, 10 formed at opposite sides of the rear suspension member 6.

Further, the front surface portion 13a of the luggage floor 13 is disposed so as to overlap at least partially with both of the rear side leg portions 9, 10 when viewed from the rear side of the vehicle. In this embodiment, since the vehicle widthwise length L2 of the front surface portion 13a is larger than the distance L1 between the rear side leg portions 9, 10, the front surface portion 13a is disposed so as to span across the entire area between the rear side leg portions 9, 10 and furthermore to span across area wider than the distance between the rear side leg portions 9, 10.

A canister 14 is disposed between a fuel tank 1 and the luggage floor 13 and is fixed to the rear side rear cross member 5. The canister 14 collects fuel evaporated within the fuel tank 1 as vapor fuel and prevents the vapor fuel from being discharged into the atmosphere. Such a canister 14 is disposed in a space 15 positioned between the left and right rear side leg portions 9, 10 and surrounded by the rear suspension member 6 and the luggage floor 13.

The canister 14 is disposed so that when the luggage floor 13 is pushed forward of the vehicle by an external force applied to the rear of the vehicle, the front surface portion 13a of the luggage floor 13 strikes the left and right rear side leg portions 9, 10 of the rear suspension member 6 to reduce the input load against the canister 14. Namely, the canister 14 is disposed between the left and right rear side leg portions 9, 10, and the front surface portion 13a of the luggage floor 13 is disposed on the vehicle rearward side of the left and right rear side leg portions 9, 10.

Figure 2:
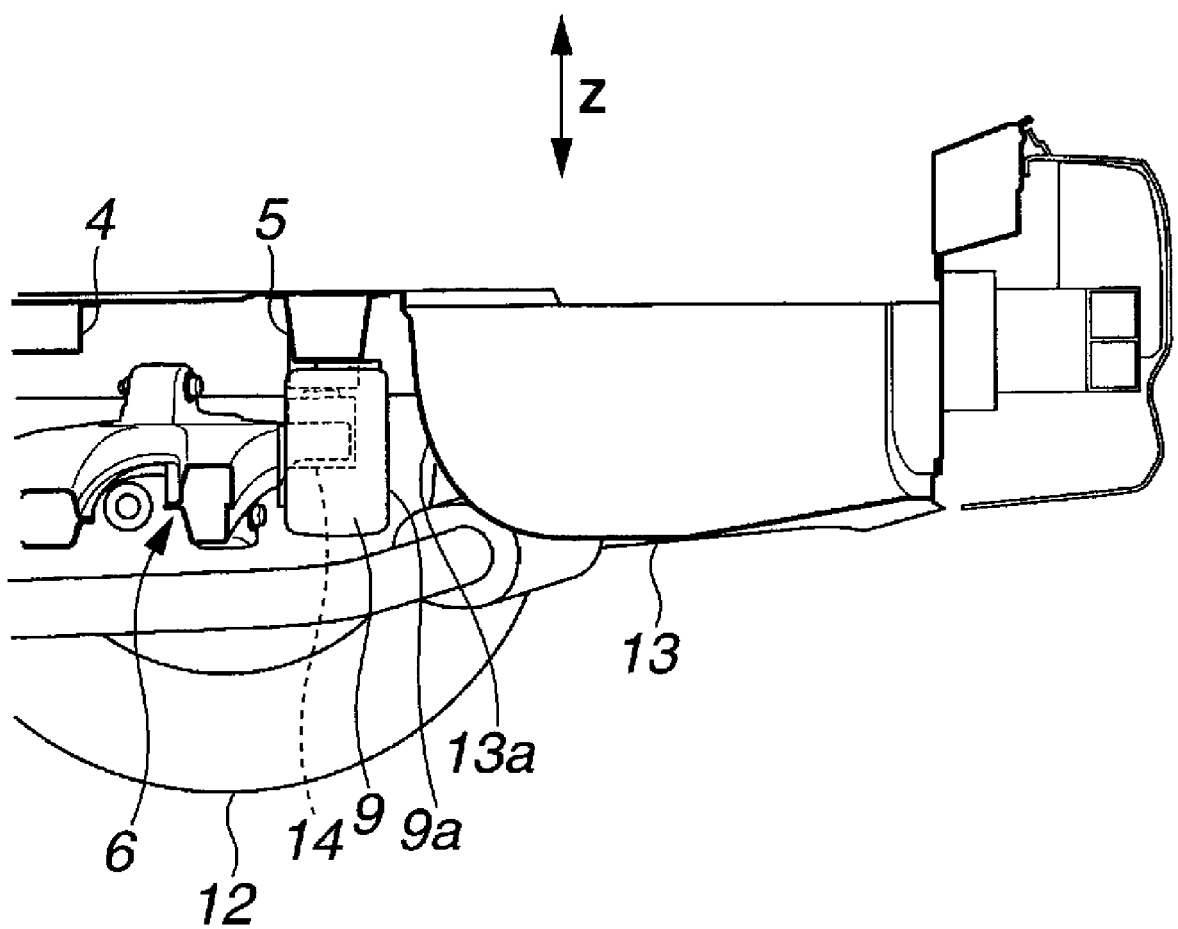
FIG. 2 is a cross sectional view of the vehicle showing the portion where the canister is disposed.
Figure 4:
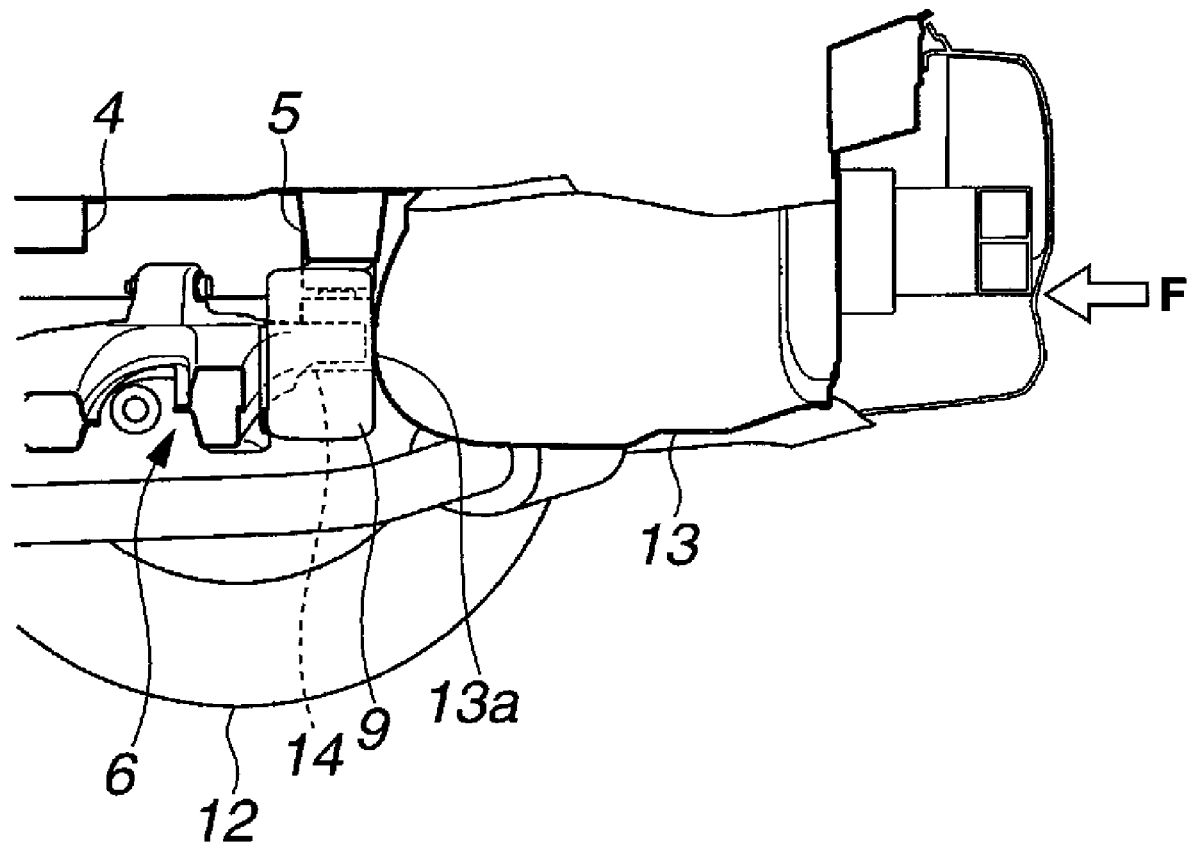
FIG. 4 is a cross sectional view of the vehicle when the front surface portion of the luggage floor strikes the left and right rear side leg portions of the rear suspension member due to the external force applied to the rear of the vehicle.

Further, as shown in FIGS. 2 and 4, the vertical height of the front surface portion 13a of the luggage floor 13 is set so as to be nearly equal to the vertical height of the left and right rear side leg portions 9, 10.

The canister 14 is also disposed so that the rear surface of the canister 14 is nearly at the same position as the rear end sections 9a, 10a of the left and right rear side leg portions 9, 10, or at a position more forward of the vehicle than that position. More specifically, the rear surface 14a on the vehicle rearward side of the canister 14 is at the same position as the rear end sections 9a, 10a of the left and right rear side leg portions 9, with respect to the vehicle longitudinal direction, or the rear surface 14a is at a position more forward on the vehicle than the rear end sections 9a, 10a. In other words, the rear surface 14a of the canister 14 nearly coincides with a straight line between the rear end sections 9a, 10a or is disposed so as to be more forward on the vehicle than that straight line.

Where the front surface portion 13a of the luggage floor 13 is not generally straight line-shaped as in this embodiment when observed in a bottom view, an arrangement is desirable whereby the distance S1 between the front surface portion 13a of the luggage floor 13 and the rear surface 14a of the canister 14 is nearly equal to or larger than the distance S2 between the front surface portion 13a of the luggage floor 13 and the rear end sections 9a, 10a of the left and right rear side leg portions 9, 10. By making such an arrangement, the input load against the canister 14 when the luggage floor 13 is pushed forward of the vehicle by an external force applied to the rear of the vehicle is reduced further, which is even more desirable.

Further, the vertical height of the front surface portion 13a of the luggage floor 13 is nearly equal to the vertical height of the left and right rear side leg portions 9, 10. By this, when the luggage floor 13 is pushed forward of the vehicle, the rear end sections 9a, 10a of the left and right rear side leg portions 9, 10 contact the front surface portion 13a of the luggage floor 13. This makes it possible to bring the luggage floor front surface portion 13a into contact with the left and right rear side leg portions 9, 10 more assuredly to reduce the input load to the canister 14.

Figure 3:
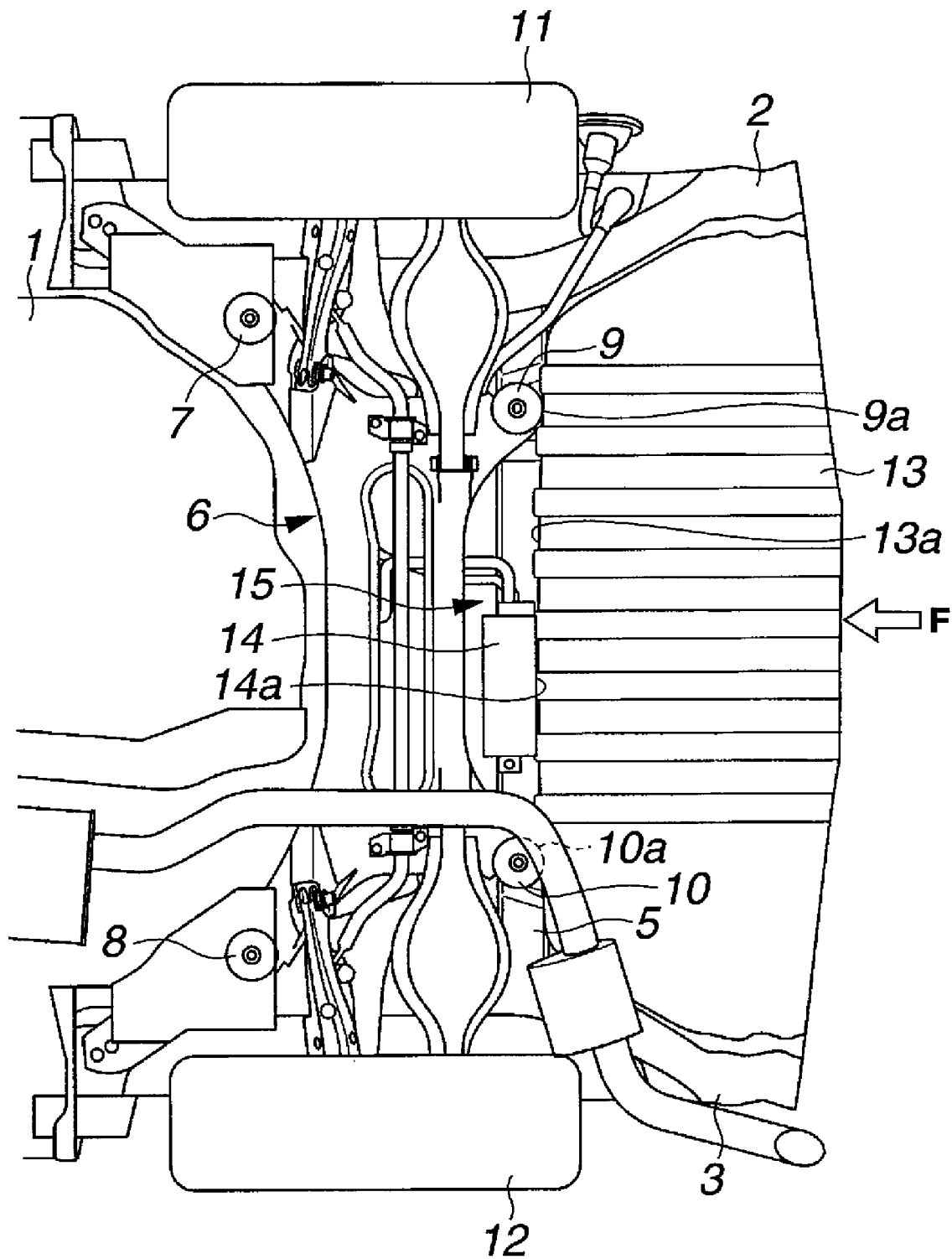
FIG. 3 is a bottom view of the vehicle when a front surface portion of a luggage floor strikes left and right rear side leg portions of a rear suspension member due to an external force applied to the rear of the vehicle.

The front surface portion 13a of the luggage floor 13 is at the position close to the left and right rear side leg portions 9, 10. By this, even when the luggage floor 13 is pushed forward of the vehicle, the luggage floor 13 does not move a long distance. Instead, the luggage floor 13 contacts the rear end sections of the left and right rear side leg portions at once, thus making it possible to bring the luggage floor front surface portion 13a into contact with the left and right rear side leg portions 9, 10 more assuredly and reducing the input load to the canister 14.

Where the canister 14 is disposed to have such a positional relationship as described above, the luggage floor 13 is pushed forward of the vehicle as shown in FIGS. 3 and 4 when acted upon by an input load F applied in the vehicle forward direction from the rear of the vehicle, and its front surface portion 13a contacts the left and right rear side leg portions 9, 10 before or nearly at the same time it contacts the canister 14.

For this reason, even when the force is sufficient to urge the luggage floor 13 to move further forward of the vehicle, the luggage floor 13 is prevented from such movement by the left and right rear side leg portions 9, 10 that are disposed at two opposed positions vehicle widthwise. By this action, it becomes possible to reduce the input load against the canister 14 that is disposed in the space portion 15.

The above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle body structure for a vehicle body comprising:
a rear suspension member extending in a vehicle width direction and having rear side leg portions provided on opposite ends of the rear suspension member in the vehicle width direction, the rear side leg portions being spaced apart by a first distance in the vehicle width direction and fixed to the vehicle body;
a luggage floor located rearward of the rear suspension member in a vehicle longitudinal direction and having a front surface extending downward in the vehicle height direction from the vehicle body, the front surface spanning a second distance in the vehicle width direction; and
a canister disposed forward in the vehicle longitudinal direction of the front surface of the luggage floor and between the rear side leg portions;
wherein the second distance is wider in a vehicle width direction than the first distance.

2. The vehicle body structure of claim 1, wherein:
the front surface of the luggage floor is configured to contact the rear side leg portions when the luggage floor is pushed forward by an external force applied from a rear of the vehicle.

3. The vehicle body structure of claim 1, wherein:
the front surface of the luggage floor is configured so that the second distance spans at least the area between the rear side leg portions when viewed in a vehicle longitudinal direction.

4. The vehicle body structure of claim 3, wherein:
a vertical height of the front surface of the luggage floor is nearly equal to a vertical height of the rear side leg portions.

5. The vehicle body structure of claim 3, wherein:
the canister includes a rear facing surface located one of in line with the rear side leg portions and forward of the rear side leg portions in the vehicle longitudinal direction.

6. The vehicle body structure of claim 1, wherein:
a vertical height of the front surface of the luggage floor is nearly equal to a vertical height of the rear side leg portions.

7. The vehicle body structure of claim 1, wherein:
the canister includes a rear facing surface located one of in line with the rear side leg portions and forward of the rear side leg portions in the vehicle longitudinal direction.

8. The vehicle body structure of claim 1, wherein:
a distance between the front surface of the luggage floor and a rear facing surface of the canister is greater than a distance between the front surface of the luggage floor and rear facing surfaces of the rear side leg portions.

9. The vehicle body structure of claim 8, wherein:
the rear facing surface of the canister is located one of in line with the rear side leg portions and forward of the rear side leg portions in the vehicle longitudinal direction.

10. A vehicle body structure for a vehicle body comprising:
a rear suspension member extending in a vehicle width direction and having rear side leg portions provided on opposite ends of the rear suspension member in the vehicle width direction, the rear side leg portions being spaced apart by a first distance in the vehicle width direction and fixed to the vehicle body;
a luggage floor located rearward of the rear suspension member in a vehicle longitudinal direction and having a front surface extending downward in the vehicle height direction from the vehicle body, the front surface spanning a second distance in the vehicle width direction; and
a canister disposed forward in the vehicle longitudinal direction of the front surface of the luggage floor and between the rear side leg portions;
wherein the front surface of the luggage floor is arranged so that the second distance spans at least the area between the rear side leg portions when viewed in the vehicle longitudinal direction.

11. The vehicle body structure of claim 10, wherein:
the front surface of the luggage floor is configured to contact the rear side leg portions when the luggage floor is pushed forward by an external force applied from a rear of the vehicle.

12. The vehicle body structure of claim 10, wherein:
a vertical height of the front surface of the luggage floor is nearly equal to a vertical height of the rear side leg portions.

13. The vehicle body structure of claim 12, wherein:
the canister includes a rear facing surface located one of in line with the rear side leg portions and forward of the rear side leg portions in the vehicle longitudinal direction.

14. The vehicle body structure of claim 10, wherein:
the canister includes a rear facing surface located one of in line with the rear side leg portions and forward of the rear side leg portions in the vehicle longitudinal direction.

15. The vehicle body structure of claim 14, wherein:
a distance between the front surface of the luggage floor and the rear facing surface of the canister is greater than a distance between the front surface of the luggage floor and rear facing surfaces of the rear side leg portions.

16. The vehicle body structure of claim 10, wherein:
a distance between the front surface of the luggage floor and a rear facing surface of the canister is greater than a distance between the front surface of the luggage floor and rear facing surfaces of the rear side leg portions.

* * * * *